United States Patent
Takahashi (10) Patent No.: US 8,269,761 B2
(45) Date of Patent: Sep. 18, 2012

(54) DISPLAY DEVICE AND METHOD OF CONTROLLING THE SAME

(75) Inventor: Kozo Takahashi, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 748 days.

(21) Appl. No.: 11/887,615

(22) PCT Filed: Apr. 5, 2006

(86) PCT No.: PCT/JP2006/307219
§ 371 (c)(1),
(2), (4) Date: Oct. 2, 2007

(87) PCT Pub. No.: WO2006/109647
PCT Pub. Date: Oct. 19, 2006

(65) Prior Publication Data
US 2009/0244052 A1   Oct. 1, 2009

(30) Foreign Application Priority Data
Apr. 7, 2005   (JP) ................. 2005-111454

(51) Int. Cl.
*G09G 5/00* (2006.01)
*G06F 3/038* (2006.01)
*G09G 3/36* (2006.01)

(52) U.S. Cl. .......................................... 345/213; 345/98

(58) Field of Classification Search ............ 345/87–103, 345/204, 211–213, 76, 82, 60
See application file for complete search history.

(56) References Cited

U.S. PATENT DOCUMENTS

| | | | |
|---|---|---|---|
| 6,031,515 A * | 2/2000 | Okamoto | 345/100 |
| 6,151,016 A * | 11/2000 | Kanbe et al. | 345/204 |
| 2004/0233228 A1 | 11/2004 | Ota | |

FOREIGN PATENT DOCUMENTS

| | | |
|---|---|---|
| JP | 63-311517 | 12/1988 |
| JP | 08-050274 | 2/1996 |
| JP | 2001-174785 | 6/2001 |
| JP | 2003-015610 | 1/2003 |
| JP | 2004-287163 | 10/2004 |

* cited by examiner

*Primary Examiner* — Stephen Sherman
(74) *Attorney, Agent, or Firm* — Harness, Dickey & Pierce, P.L.C.

(57) ABSTRACT

A liquid crystal display panel (LCD) including a plurality of pixels. A plurality of drivers are provided and switched between a driving state and a non-driving state in response to an ON/OFF signal that is fed. The plurality of drivers drive the plurality of pixels of the liquid crystal display panel on the basis of a display data signal and a synchronizing signal, including a vertical synchronizing signal VSYNC, so that an image responsive to the display data signal is shown on the liquid crystal display panel. A signal generating section is provided to generate, on the basis of the vertical synchronizing signal VSYNC and the ON/OFF signal that is fed, a new ON/OFF signal synchronized with the vertical synchronizing signal VSYNC, and feeds the new ON/OFF signal into the drivers.

12 Claims, 5 Drawing Sheets

DISPLAY DEVICE AND METHOD OF CONTROLLING THE SAME

TECHNICAL FIELD

The present invention relates to a display device, such as a liquid crystal display device, by which deterioration in quality of a display at the time when the display becomes ON/OFF is avoided. The present invention also relates to a method of controlling the display device.

BACKGROUND ART

Display devices for mobile phones and the like adopt a method in which a display ON signal and a display OFF signal are transmitted to a display device to switch the display device between a displaying state and a non-displaying state.

Figure 4:
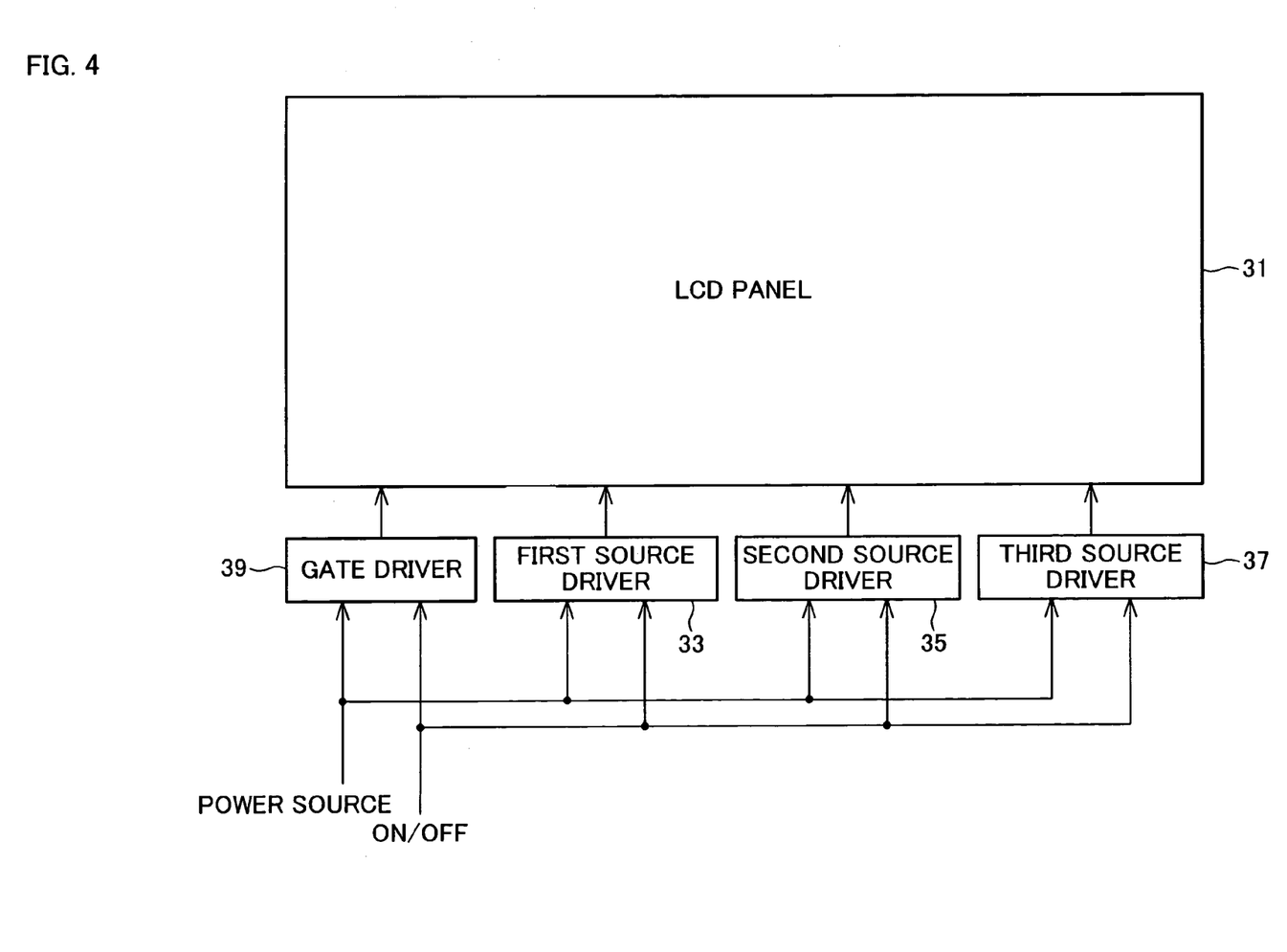

FIG. 4 is a block diagram showing a structure of a display device employed in conventional mobile phones and the like. The display device includes a liquid crystal display (this display will be referred to as "LCD" hereinafter) panel 31, which is a display section, first to third source drivers 33, 35, 37 to drive respective pixels of the LCD panel 31, and a gate driver 39.

To switch a display state of the LCD panel 31 from ON to OFF in the display device, an OFF signal is fed into the first to third source drivers 33, 35, 37 and the gate driver 39. As a result, the first to third source drivers 33, 35, 37 and the gate driver 39 stop operating, and the display state of the LCD panel 31 becomes OFF.

On the other hand, to switch the display state of the LCD panel 31 from OFF to ON, an ON signal is fed into the first to third source drivers 33, 35, 37 and the gate driver 39. As a result, the first to third source drivers 33, 35, 37 and the gate driver 39 start operating, and the display state of the LCD panel 31 becomes ON.

The display device disclosed in Publication 1 is known as a concrete way to switch the display state in the manner as described above. Specifically, the display device includes a circuit that switches the display state. The circuit is constituted of, for example, a combination of a latch circuit, an AND circuit, and the like. A user presses a display ON/OFF key of a keyboard to activate a program to switch the display state of a CRT that is a display section. The display device having the circuit allows the display state to be switched promptly. Further, the display device does not turn ON/OFF a power source for the entire display device but controls only an ON/OFF state of a display. Thus, for example a power-saving mode in which only a display is turned OFF is realized.

Publication 2 discloses a technique by which operation of a source driver (this driver is referred to as "drain driver" in Publication 2) is synchronized with a rise or a fall of a vertical synchronizing signal (this signal will be referred to as "VSYNC" hereinafter).

[Publication 1] Japanese Unexamined Patent Publication No. 311517/1988 (Tokukaisho 63-311517) (Publication Date: Dec. 20, 1988)

[Publication 2] Japanese Unexamined Patent Publication No. 174785/2001 (Tokukai 2001-174785) (Publication Date: Jun. 29, 2001)

DISCLOSURE OF INVENTION

Technical Problems

Publication 1 employs the CRT as the display device. If this technique of Publication 1 is applied to a liquid crystal display device having a plurality of source drivers, there arises a problem that the ON/OFF state is switched at a midpoint of a display shown on a screen (timing of the switching between ON and OFF varies from one section to another) so that quality of the display shown on the screen deteriorates, making the display difficult to see.

In a case in which the technique of Publication 1 is applied to the conventional liquid crystal display device shown in FIG. 4, there is one way to prevent the timing of the switching (ON/OFF) of the display on the screen from varying from one section to another. Specifically, timings when the first to third source drivers 33, 35, 37 and the gate driver 39 receive an ON/OFF signal (this signal is referred to as "ON/OFF" in the figure) are synchronized with a rise or a fall of a vertical synchronizing signal (this signal will be referred to as "VSYNC" hereinafter), in reference to the technique of Publication 2.

Figure 5:
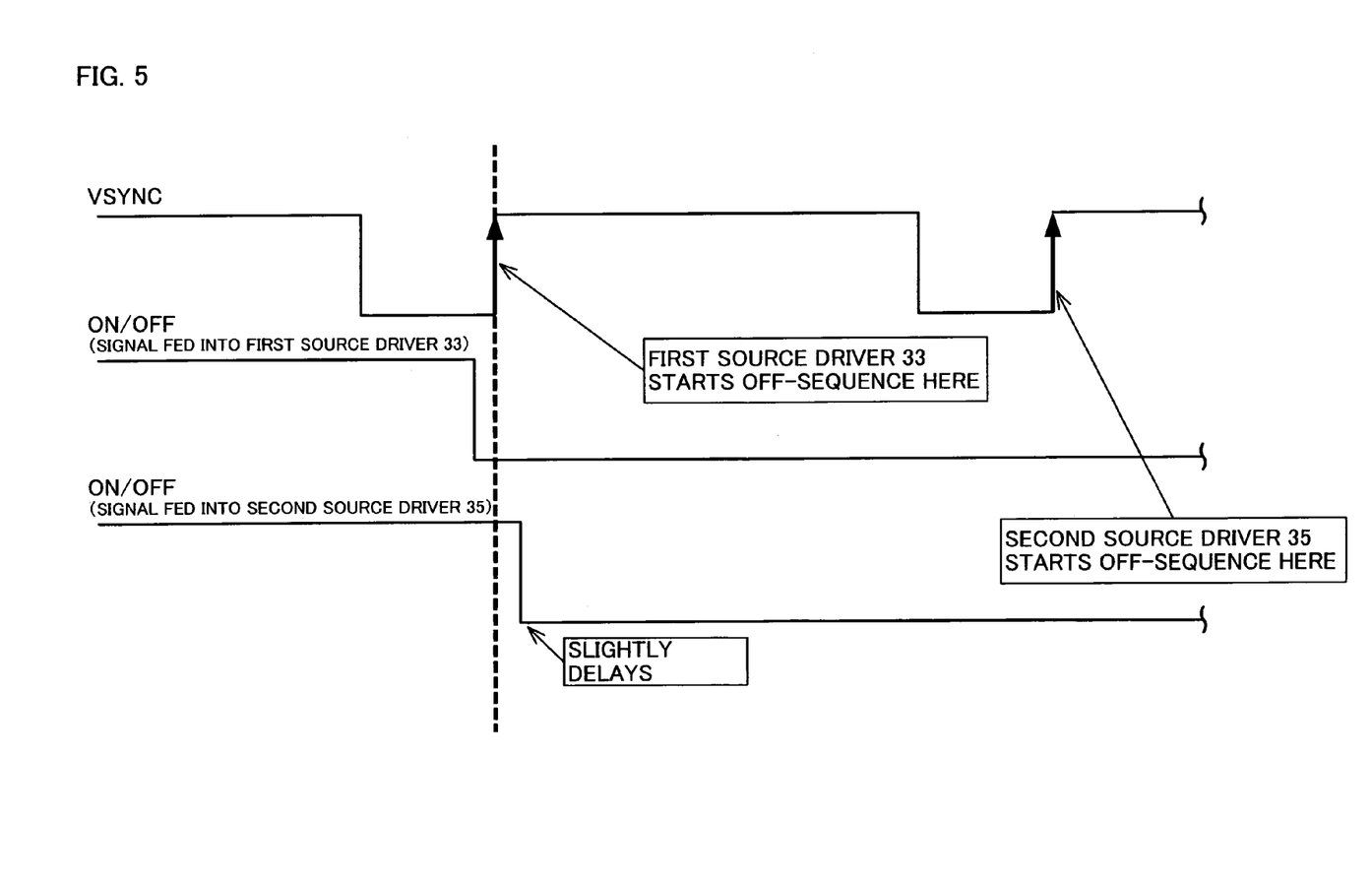

However, this method utilizing the VSYNC also has a problem that quality of displays deteriorates at the time of ON operation and at the time of OFF operation. The following describes the problem, with reference to FIG. 5. FIG. 5 is shows a timing diagram of the first to third source drivers 33, 35, 37 and the gate driver 39 to illustrate the problem.

The display device shown in FIG. 4 includes plural source drivers, which are the first to third source drivers 33, 35, 37. Control signals that are the display ON signal and the display OFF signal are fed parallel to the first to third source drivers 33, 35, 37. As shown in FIG. 4, respective lengths of wirings connected to the first to third source drivers 33, 35, 37 vary from one source driver to another. Thus, delay occurs so that the timings of feeding the control signals to the first to third source drivers 33, 35, 37 vary from one source driver to another.

If the delay occurs, for example the control signals are switched at different timings between the first source driver 33 and the second source driver 35 as shown in FIG. 5. Thus, the control signal in the first source driver 33 changes to the Low-level before a rise of the VSYNC, and the control signal in the second source driver 35 changes to Low-level after the rise of the VSYNC. In this case, there arises a period of time, which is approximately one frame, during which the first source driver 33 is. OFF while the second source driver 35 is ON, as shown in FIG. 5. This causes some sections of the display on the screen to switch ON/OFF at different timings from one another. Specifically, in conventional display devices such as liquid crystal display devices, if a display OFF sequence differs from one driver to another, the display shown on the screen switches ON/OFF with deviation by several fractions. This causes a problem of deterioration in quality of the display so that display quality of the display device deteriorates when the display state is switched.

The present invention has as an object to prevent deterioration in quality of displays at the time of switching the display state between ON and OFF in the display devices having a plurality of drivers (driving circuit).

Technical Solutions

To solve the above problems, a display device of the present invention is adapted so that the display device, includes: a display section where a plurality of pixels are arranged to show an image; a plurality of driving circuits driving each of the plurality of pixels of the display section on a basis of a display data signal and a synchronizing signal so that an image responsive to the display data signal is shown on the display section; and a signal generating section generating, on a basis of the synchronizing signal and an ON/OFF signal that is fed, a new ON/OFF signal synchronized with the synchronizing signal, and feeding the new ON/OFF signal into the plurality of driving circuits, the plurality of driving circuits switching a driving state and a non-driving state on a basis of the new ON/OFF signal.

With this structure, the plurality of driving circuits switch the display section between the driving state and the non-driving state in response to the new ON/OFF signal, which is generated in synchronization with the synchronizing signal by the signal generating section. Thus, the display shown on the screen is prevented from fluctuating, e.g. the timing of the switching between the driving state and the non-driving state differs by one frame from one section to another on the screen (display section). Therefore, the display is prevented from deteriorating in quality at the time of the switching.

Further, with the above structure, it is not necessary to provide a latch circuit or the like to the respective drivers, on the contrary to the conventional structure of Publication 2. Thus, complication and increase in size of the structure are avoided.

In the display device, the synchronizing signal may be a vertical synchronizing signal that changes in a period of one frame, which is one periodic time. That is to say, the synchronizing signal is a vertical synchronizing signal that changes in the period of one frame, which is one periodic time. When the ON/OFF signal that indicates the switching between the driving state and the non-driving state is fed, the signal generating section may synchronize the timing of the switching with the synchronizing signal.

In the display device, the signal generating section may time the switching of the new ON/OFF signal between the driving state and the non-driving state so that the switching coincides with a part of the synchronizing signal, which part shows a first indication of a start of writing on the display section after the ON/OFF signal is fed.

In the display device, the display section may be a liquid crystal panel including two substrates and a liquid crystal layer sandwiched between the two substrates; at least one of the two substrates includes: a plurality of scanning lines provided so as to extend in a direction of a row; and a plurality of signal lines provided so as to extend in a direction of a column; the plurality of pixels are placed at intersections where the plurality of scanning lines and the plurality of signal lines cross; and the plurality of driving circuits apply voltage to the plurality of scanning lines or to the plurality of signal lines.

In the display device, the plurality of driving circuits may apply voltage to the plurality of scanning lines. Further, in the display device, the plurality of driving circuits may apply voltage to the plurality of signal lines.

In the display device, said plurality of driving circuits include at least one master driving circuit and at least one slave driving circuit; and said signal generating section is provided in said at least one master driving circuit.

To solve the above problems, a method of controlling a display device in accordance with the present invention is adapted so that the method of controlling a display device in which a display section where a plurality of pixels are arranged to show an image is driven by a plurality of driving circuits on a basis of a display data signal and a synchronizing signal so that an image responsive to the display data signal is shown on the display section, includes: generating, on a basis of the synchronizing signal and an ON/OFF signal that is fed, a new ON/OFF signal synchronized with the synchronizing signal; feeding the new ON/OFF signal to the plurality of driving circuits; and switching a driving state and a non-driving state on a basis of the new ON/OFF signal.

With this method, the plurality of driving circuits switch the display section between the driving state and the non-driving state in response to the new ON/OFF signal generated in synchronization with the synchronizing signal. Thus, the display shown on the screen is prevented from fluctuating, e.g. the timing of the switching between the driving state and the non-driving state differs by one frame from one section to another on the screen (display section). Therefore, the display is prevented from deteriorating in quality at the time of the switching.

Further, with the method, it is not necessary to provide a latch circuit or the like to the respective drivers, on the contrary to the conventional structure of Publication 2. Thus, complication and increase in size of the structure are avoided.

Advantageous Effect of the Invention

With the foregoing structure and method, the plurality of driving circuits control the ON/OFF state of each display in response to the new ON/OFF signal that is generated in synchronization with the synchronizing signal and fed into the respective driving circuits. This prevents the driving circuits from switching at different timings so that deterioration in quality of the display is prevented. Further, it is only necessary to synchronize the ON/OFF signal by the signal generating section. This produces an advantageous effect that the device is simplified and reduced in size.

BRIEF DESCRIPTION OF DRAWINGS

FIG. 1

This is a block diagram showing main sections of a liquid crystal display device that is a display device according to the present invention.

FIG. 2

This is a block diagram schematically showing the liquid crystal display device.

FIG. 3

This is a set of timing diagrams illustrating a method of controlling the liquid crystal display device.

FIG. 4

This is a block diagram schematically showing a conventional liquid crystal display device.

FIG. 5

This is a set of timing diagrams showing differences that arise in a conventional method of controlling a liquid crystal display device.

EXPLANATION OF REFERENCE NUMBERS

1 LCD panel (display section)
3 master source driver (master driving circuit)
3c signal generating section
5 slave source driver (slave driving circuit)
7 slave source driver (slave driving circuit)
9 gate driver (driving circuit)

BEST MODE FOR CARRYING OUT THE INVENTION

Overview of the Invention

In the present embodiment, the following process is carried out to prevent fluctuation in displays that occurs when a display state is switched from ON to OFF in a display device having a plurality of driving circuits. First, an ON/OFF signal is fed into a signal generating section to switch an ON/OFF state of the respective driving circuits. The signal generating section may be provided either as an independent circuit or as a part of the driving circuits. The signal generating section synchronizes the ON/OFF signal with a synchronizing signal to generate a new ON/OFF signal, and feeds the new ON/OFF signal to the plurality of driving circuits.

(Overall Structure)

Figure 1:
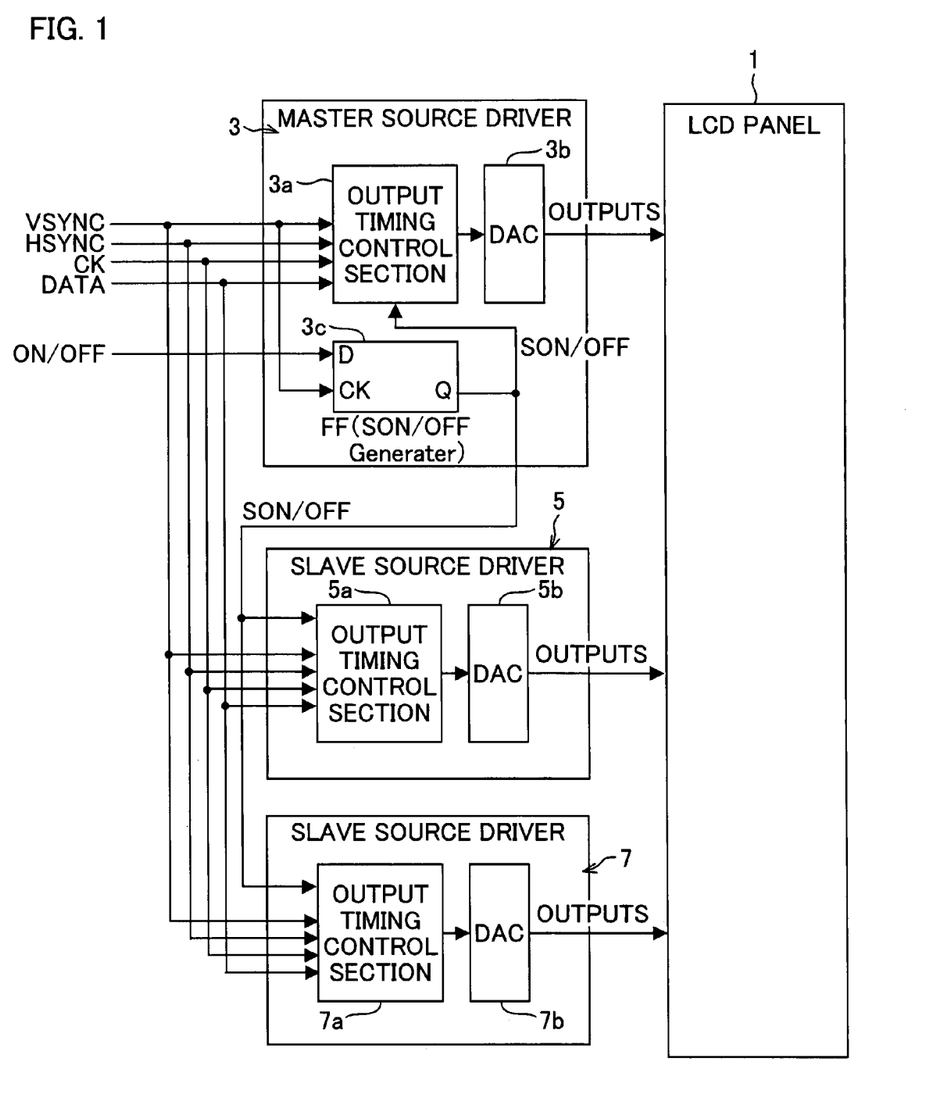
Figure 2:
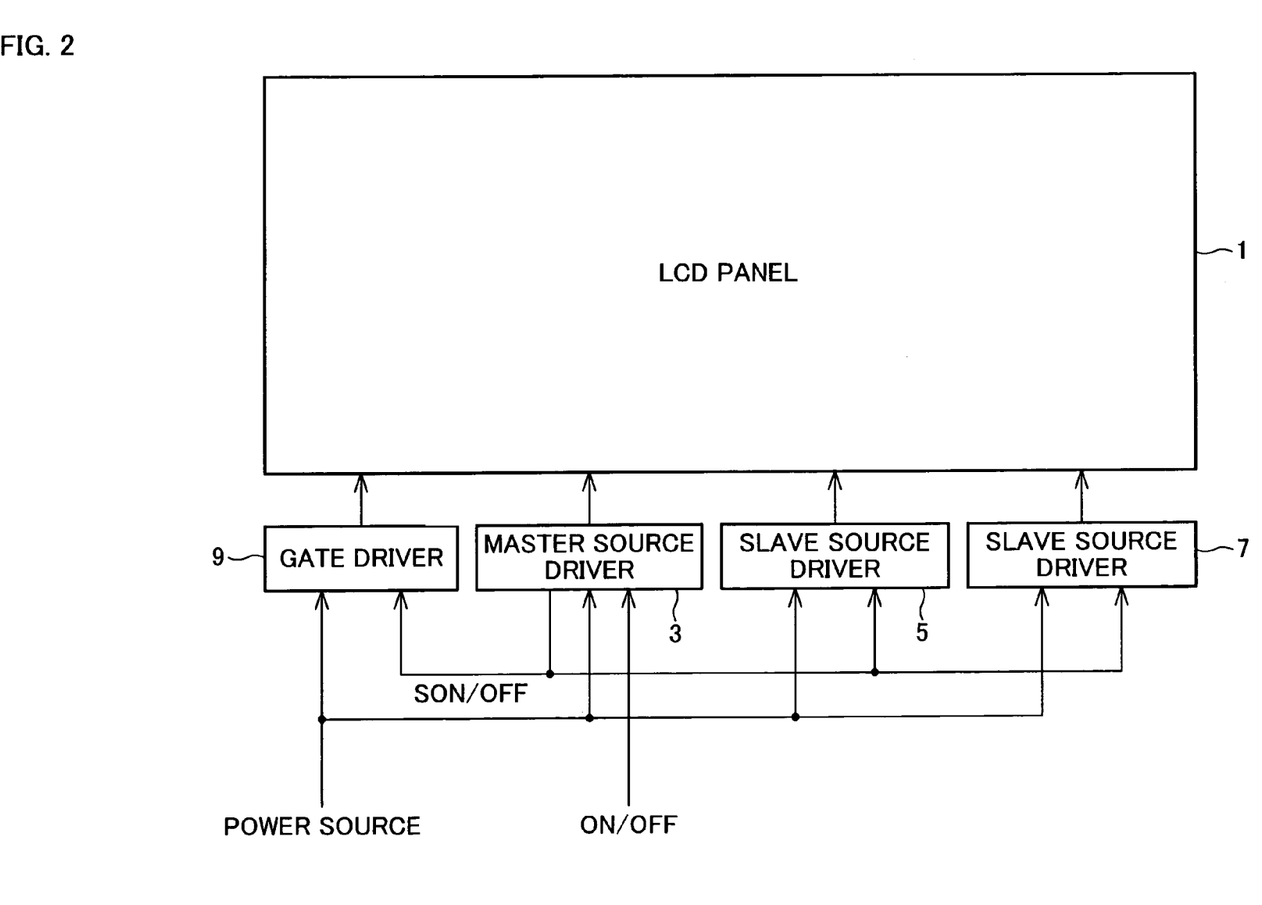
Figure 3:
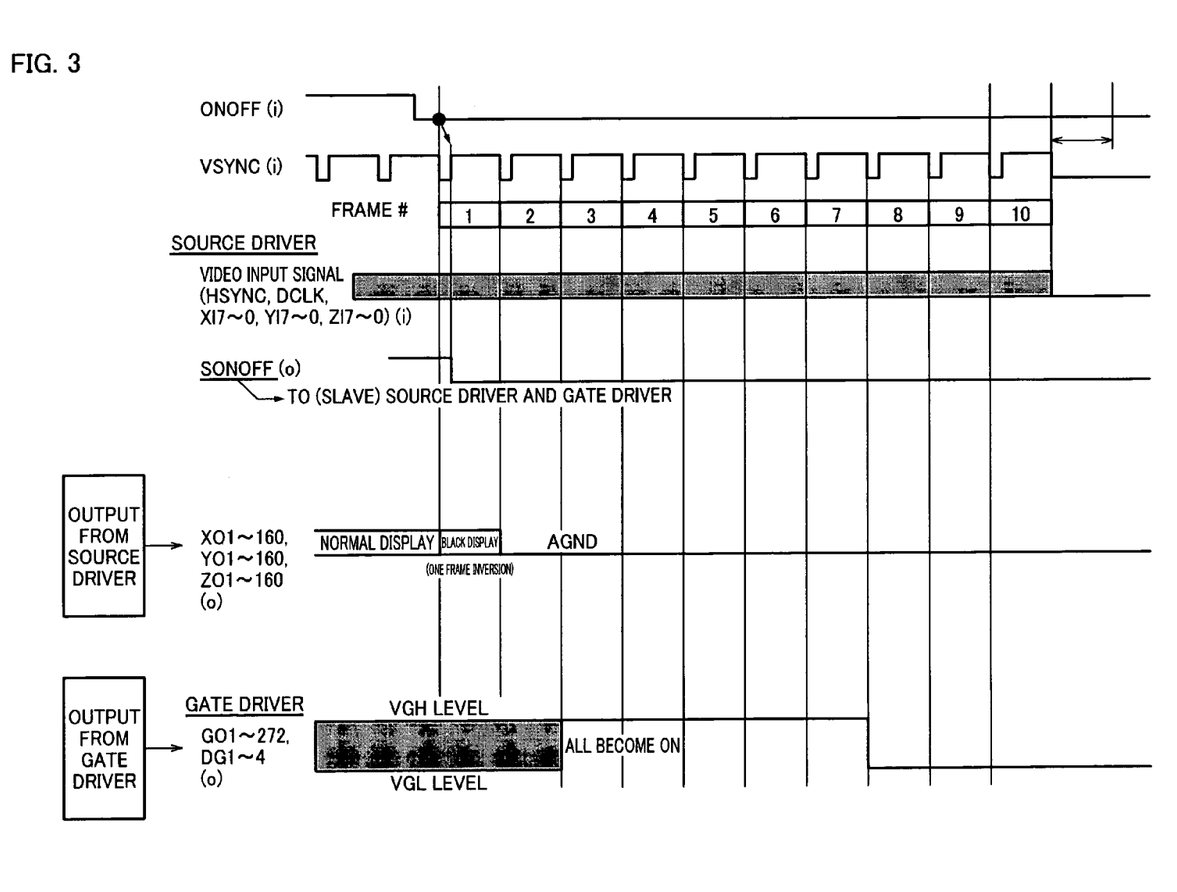

The following describes in detail a liquid crystal display device that is a display device of an embodiment of the present invention, with reference to FIGS. 1 to 3. FIG. 1 is a block diagram showing a detailed structure of the liquid crystal display device. Note that a gate driver is omitted in FIG. 1. FIG. 2 is a block diagram showing an overall structure of the liquid crystal display device. FIG. 3 shows waveforms of signals at the time when the liquid crystal display device stops driving.

Among various methods of showing displays on the liquid crystal display device, an active matrix method in which a TFT (Thin Film Transistor) is employed as a switching device is known as a method by which fine displays are realized. A liquid crystal display device is discussed in the present embodiment as an exemplary display device of the present invention, but, as described later, any display devices in which pixels are arranged in matrix and scanned one after another can be employed as the display device. Examples of the display device include flat panel displays, such as plasma displays and electro-luminescence displays, and CRT.

As shown in FIG. 2, the liquid crystal display device of the active matrix method includes an LCD panel (display section) 1 on which images responsive to display data signals are displayed, a master source driver 3, slave source drivers 5, a slave source driver 7, and a gate driver 9. The master source driver 3, the slave source driver 5, the slave source driver 7, and the gate driver 9 are LC (liquid crystal) driving circuits to drive the LCD panel.

A liquid crystal display device having three source drivers and one gate driver is discussed in the present embodiment as an exemplary liquid crystal display device, but the number of the respective driving circuits is not particularly limited. The number of the respective driving circuits is determined in a manner that depends on the number of pixels and on display quality that is demanded, as discussed below.

The LCD panel 1 includes a first substrate (not illustrated), a second substrate (not illustrated), and a liquid crystal layer (not illustrated). The first substrate and the second substrate are each realized typically by a glass substrate, and are provided parallel to each other with a predetermined space therebetween. The liquid crystal layer is sealed in between the first substrate and the second substrate.

The first substrate is so-called an active matrix substrate. A plurality of data signal lines (not illustrated) extending in the direction of columns and a plurality of scanning line (not illustrated) extending in the direction of rows are formed on a main surface of the first substrate, which main surface is on a side where the liquid crystal layer is provided. Pixels (not illustrated) are placed at all intersections where the data signal lines and the scanning lines cross. The present embodiment discusses an exemplary case in which pixels are arranged by 1024 pixels×768 pixels (XGA). Change in a transmissivity of light in respective pixels due to the display data signals fed into the plurality of data signal lines is scanned, from one scanning line to another, either sequentially or intermittently in a vertical direction, whereby an image is displayed on the LCD panel 1. The present embodiment discusses the case in which the data signal lines and the scanning lines are formed on the first substrate, but the arrangement of those lines is not limited thereto, as long as the data signal lines and the scanning lines are formed on at least one of the substrates.

In the case of the XGA, the number of the scanning lines is 768, and a scanning line is 1024 pixels (i.e. the number of data signal lines is 1024). Examples of the number of pixels include; 1280 pixels×1024 pixels (SXGA); 1600 pixels× 1200 pixels (UXGA); and 3200 pixels×2400 pixels (2.7 p/J). Any of the above is adopted in a manner that depends on necessity. Further, wide screens other than those with the screen ratio of 4:3, such as full HD (1920×1080) and WXGA (1366×768), are also employed.

The master source driver 3, the slave source driver 5, and the slave source driver 7 are the driving circuits applying, to the scanning lines of the LCD panel 1, a voltage responsive to a display data signal DATA to cause the pixels to show images. The display data signal DATA is a signal for causing the pixels to display images.

(Structure of Drivers)

The following describes in detail the master source driver 3, the slave source driver 5, and the slave source driver 7. The display data signal DATA is fed into the liquid crystal display device externally via a controller (not illustrated). The display data signal DATA is a serial digital signal indicating what to be displayed on the LCD panel 1. As shown in FIG. 1, the display data signal DATA is fed into the master source driver 3, the slave source driver 5, and the slave source driver 7. The master source driver 3, the slave source driver 5, and the slave source driver 7 each time-share the display data signal DATA and then latch the display data signal DATA in output timing control sections (Timing Generator) 3a, 5a, 7a, respectively. Thereafter, the digital-analog converters (the converters are referred to as "DAC" in the figures) 3b, 5b, 7b each convert the display data signal DATA from a digital signal into an analog signal, in synchronization with a horizontal synchronizing signal HSYNC that is fed via the controller. Then, the digital-analog converters 3b, 5b, 7b each feed the display data signal DATA, as a display data signal OUTPUTS that is parallel and analog, to the data signal lines of the LCD panel 1.

The controller feeds a horizontal synchronizing signal HSYNC (this signal corresponds to a start pulse signal SP or a latch signal Ls) and a clock signal CK, which are control signals, to the master source driver 3, the slave source driver 5, and the slave source driver 7. The controller also feeds a vertical synchronizing signal VSYNC and the horizontal synchronizing signal HSYNC to the gate driver 9. The controller includes an I/O circuit, a display RAM to store the display data signal DATA, a generating circuit for the various control signals, and an output circuit for the various control signals. The vertical synchronizing signal VSYNC and the horizontal synchronizing signal HSYNC are both pulse signals that are utilized to provide a timing of displaying images and become High-level and Low-level alternately. Specifically, the horizontal synchronizing signal HSYNC drives the scanning lines at a predetermined period. The clock signal CK changes in its voltage level at a certain period to drive the driving circuits. The vertical synchronizing signal VSYNC defines a start of a display on a screen. In the present embodiment, the vertical synchronizing signal VSYNC is a signal in which, for example, Low-level is repeated at an interval of 50 Hz for a period that is 2% to 5% of a period of High-level.

The master source driver 3 is fed with the ON/OFF signal. The ON/OFF signal is to switch the master source driver 3, the slave source driver 5, the slave source driver 7, and the gate driver 9 between a driving state and a non-driving state.

When switched from the driving state to the non-driving state, the master source driver 3 synchronizes, in a D-type flip-flop shown in FIG. 1, the ON/OFF signal with the vertical synchronizing signal VSYNC to generate a SON/OFF signal, which is a new ON/OFF signal synchronized with the vertical synchronizing signal VSYNC. Then, the master source driver 3 feeds this SON/OFF signal into the output timing control section 3*a*, the output timing control section 5*a*, the output timing control section 7*a*, and the gate driver 9.

In response to the SON/OFF signal that is fed, the master source driver 3, the slave source driver 5, the slave source driver 7, and the gate driver 9 carry out an OFF sequence to switch from the driving state to the non-driving state.

To realize the operation mentioned above, the master source driver 3 includes the signal generating section 3*c*. The signal generating section 3*c* synchronizes a timing of the switch of the ON/OFF signal that is fed, with a timing of a rise of the vertical synchronizing signal VSYNC to generate the SON/OFF signal. The master source driver 3 (signal generating section 3*c*) feeds the SON/OFF signal into the master source driver 3, the slave source driver 5, the slave source driver 7, and the gate driver 9.

The signal generating section 3*c* is not particularly limited, as long as the signal generating section 3*c* is able to synchronize the ON/OFF signal with the vertical synchronizing signal VSYNC. An exemplary signal generating section 3*c* is the D-type flip-flop. In the case in which the D-type flip-flop is employed, the ON/OFF signal is fed into the terminal D, and the vertical synchronizing signal VSYNC is fed into the terminal CK. This allows the D-type flip-flop to output, from the terminal Q, the SON/OFF signal, which is the ON/OFF signal with its switching timing being synchronized with the timing of the rise of the vertical synchronizing signal VSYNC. It is preferable that the signal generating section 3*c* be provided inside of the master source driver 3.

The SON/OFF signal may be a new signal generated by synchronizing the switching timing of the ON/OFF signal with a timing of a fall of the vertical synchronizing signal VSYNC. In this case, pulses of the vertical synchronizing signal VSYNC that is fed into the terminal CK are inversed by an inverter or the like.

(Operation at the Time when a Display is Off)

The following describes operation of the liquid crystal display device of the foregoing structure in accordance with the present embodiment, with reference to the figures. FIG. 3 shows waveforms (timing diagram) of the respective signals at the time when the liquid crystal display device switches from an ON state to an OFF state. The first line shows a waveform of the ON/OFF signal. The second line shows a waveform of the vertical synchronizing signal VSYNC. The fourth line shows a waveform of the SON/OFF signal. The eighth line shows an output signal from the source driver to the data signal line. The ninth line shows an output signal from the gate driver to the scanning line.

First, the ON/OFF signal indicating that the display state of the liquid crystal display device is to switch from the ON state to the OFF state is fed into the signal generating section 3*c*. Specifically, the ON/OFF signal is switched from High-level to Low-level as shown in FIG. 3. In response thereto, the signal generating section 3*c* synchronizes the ON/OFF signal with the vertical synchronizing signal VSYNC. The following provides more detailed description.

The vertical synchronizing signal VSYNC changes in a period of one frame, which is one periodic time, as shown in FIG. 3. The period of one frame in a non-interlaced method indicates a length of time necessary for scanning one screen's scanning lines. The period of one frame in an interlaced method indicates a length of time necessary to display two fields: a first field in which only odd-numbered scanning lines are scanned; and a second field in which even-numbered scanning lines are scanned.

As shown in FIG. 3, the signal generating section 3*c* generates the SON/OFF signal in synchronization with a timing of a first rise of the vertical synchronizing signal VSYNC after the vertical synchronizing signal VSYNC is switched from High-level to Low-level (this timing is described as "a start of writing on the display section" in the Claims), that is to say, a timing when the vertical synchronizing signal VSYNC is switched from Low-level to High-level.

After having generated the SON/OFF signal, the signal generating section 3*c* feeds the SON/OFF signal into the output timing control section 3*a*, the output timing control section 5*a*, the output timing control section 7*a*, and the gate driver 9 (not illustrated in FIG. 1).

Then, the output timing control section 3*a*, the output timing control section 5*a*, the output timing control section 7*a*, and the gate driver 9 start the OFF sequence. Specifically, when the SON/OFF signal is switched from High-level to Low-level, the LCD panel 1 is switched from a normal display to a black display. An entirely black image is displayed on the LCD panel 1 for a period of one frame. The following provides more detailed description.

When the SON/OFF signal is High-level, the output timing control section 3*a*, the output timing control section 5*a*, and the output timing control section 7*a* are fed, by the controller, with the display data signal DATA for displaying the normal image. The output timing control section 3*a*, the output timing control section 5*a*, and the output timing control section 7*a* convert, in the DAC 3*b*, the DAC 5*b*, and the DAC 7*b*, respectively, the display data signal DATA into the analog display data signal OUTPUTS on the basis of the horizontal synchronizing signal HSYNC. The output timing control section 3*a*, the output timing control section 5*a*, and the output timing control section 7*a* then feed the analog display data signal OUTPUTS into the LCD panel 1. Consequently, a normal image is displayed on the LCD panel 1. The normal image here is an image that is to be displayed when the LCD panel 1 is in the ON state. The normal image, for example, is an image displayed on a liquid crystal display device of a mobile phone that is in a standby state.

When the SON/OFF signal is switched to Low-level, the controller outputs the display data signal DATA for the period of one frame to cause the LCD panel 1 to show the black display. In response thereto, the output timing control section 3*a*, the output timing control section 5*a*, and the output timing control section 7*a* feed, on the basis of the horizontal synchronizing signal HSYNC, the analog display data signal OUTPUTS into the LCD panel 1 via the DAC 3*b*, the DAC 5*b*, and the DAC 7*b*, respectively, to cause the LCD panel 1 to show the black display. Thereafter, when the period of one frame has passed, the master source driver 3, the slave source driver 5, and the slave source driver 7 make the respective data signal lines grounded (AGND). Consequently, electrical charges having been accumulated are eliminated. After the electrical charges having been accumulated in the data signal lines are eliminated, the gate driver 9 stops operating. The OFF sequence is then completed.

Accordingly, in the liquid crystal display device of the present embodiment, the master source driver 3 synchronizes the switching timing of the ON/OFF signal with the timing of the rise of the vertical synchronizing signal VSYNC to generate the SON/OFF signal. This solves the problem of fluctuation in images during the OFF sequence, which problem results from the differences in the lengths of the wirings extending to the respective drivers. The following provides more detailed description.

In the conventional liquid crystal display devices, the switching timing of the ON/OFF signal fed into the first source driver 33 and the switching timing of the ON/OFF signal fed into the second source driver 35 sometimes come ahead and behind a rise of the vertical synchronizing signal VSYNC as shown in FIG. 5. This brings a consequence that the first source driver 33 carries out the OFF sequence at a first rise of the vertical synchronizing signal VSYNC shown in FIG. 5 while the second source driver 35 carries out the OFF sequence at a second rise of the vertical synchronizing signal VSYNC. If the plurality of source drivers carry out the OFF sequence at different timings, images fluctuate during the OFF sequence. Specifically, at the second rise of the vertical synchronizing signal VSYNC shown in FIG. 5, pixels corresponding to the first source driver 33 show the black display while pixels corresponding to the second source driver 35 show the normal image.

On the other hand, in the liquid crystal display device of the present embodiment, the switching timing of the ON/OFF signal is synchronized with the timing of the rise of the vertical synchronizing signal VSYNC to generate the SON/OFF signal as shown in FIG. 3. The SON/OFF signal is then fed into the respective source drivers. The respective source drivers then carry out the OFF sequence on the basis of the SON/OFF signal.

The lengths of the wirings to the respective source drivers in the liquid crystal display device of the present embodiment are different, in the same manner as in the conventional devices. Thus, the source drivers differ in the switching timing of the SON/OFF signal. However, the period of one frame is significantly longer than the difference in the switching timing of the SON/OFF signal. Thus, switches of the respective SON/OFF signals do not come ahead and behind a rise of the vertical synchronizing signal VSYNC in the liquid crystal display device of the present embodiment. Therefore, the images do not fluctuate at the time when the OFF sequence is started.

The foregoing describes the liquid crystal display device of the present embodiment in regard to the OFF sequence. The liquid crystal display device of the present embodiment is also applicable to an ON sequence. The following provides more detailed description.

First, the ON/OFF signal is fed into the master source driver 3. At this time, signals necessary for displaying, such as the vertical synchronizing signal VSYNC, the horizontal synchronizing signal HSYNC, the clock signal CK, and the display data signal DATA, are also fed into the master source driver 3, the slave source drivers 5 and 7, and the gate driver 9 (Step 1).

Then, the ON/OFF signal is fed into a data input (terminal D) of the signal generating section 3c in the master source driver 3, and the vertical synchronizing signal VSYNC is fed into a terminal CK of the signal generating section 3c. Then, the SON/OFF signal synchronized with the vertical synchronizing signal VSYNC is output from a terminal Q of the signal generating section 3c (Step 2).

Thereafter, the SON/OFF signal is fed into the output timing control sections 3a, 5a, 7a of the master source driver 3, the slave source drivers 5 and 7, and the gate driver 9 to start a display ON sequence (Step 3). Then, outputs of the master source driver 3, the slave source drivers 5 and 7, and the gate driver 9 are fed into the LCD panel 1 so that a display becomes ON (Step 4).

In the present embodiment, the signal generating section 3c is provided to the master source driver 3, but a section where the signal generating section 3c is to be provided is not limited to the master source driver 3. For example, the signal generating section 3c may be provided to the gate driver 9.

Further, the SON/OFF signal is fed into the slave source drivers 5 and 7 in the present embodiment, but a section to which the SON/OFF signal is to be fed is not limited to the slave source drivers 5 and 7. For example if a plurality of gate drivers are provided, the master gate driver may generate the SON/OFF signal and feeds the SON/OFF signal to the slave gate drivers.

Further, the source driver and the gate driver are formed on the semiconductor substrate and installed into the LCD panel in the present embodiment, but a section where the source driver and the gate driver are to be formed is not limited to the semiconductor substrate. The source driver and the gate driver may be formed directly onto an active matrix substrate by use of a monolithic technique, for example.

INDUSTRIAL APPLICABILITY

With a display device and a method of controlling the display device of the present invention, an ON/OFF state of a display shown on a screen is controlled to save power, to promptly switch the ON/OFF state, and to switch the display on the screen entirely and simultaneously. Thus, the display shown on the screen is prevented from deteriorating at the time of the switching. The present invention is applicable to the fields of the display devices such as LCDs.

The invention claimed is:
1. A display device, comprising:
a display section including a plurality of pixels;
a plurality of driving circuits configured to drive each of the plurality of pixels of the display section based on a display data signal and a synchronizing signal; and
a signal generating section configured to generate, on a basis of the synchronizing signal and an ON/OFF signal, the ON/OFF signal for switching between a driving state and a non-driving state of the plurality of driving circuits, a new ON/OFF signal for switching between the driving state and the non-driving state of the plurality of driving circuits, the new ON/OFF signal synchronized with the synchronizing signal, and to feed the new ON/OFF signal into the plurality of driving circuits,
wherein the plurality of driving circuits are configured to switch between the driving state and the non-driving state on a basis of the new ON/OFF signal,
the synchronizing signal is a vertical synchronizing signal that changes in a period of one frame, which is one periodic time, and
the signal generating section is configured to feed the new ON/OFF signal into the plurality of driving circuits such that the plurality of driving circuits switch between the driving state and the non-driving state in synchronization with timing of a rise or a fall of the synchronizing signal, the rise or the fall of the synchronizing signal indicating a start of writing on the display section in a period of one frame corresponding to the rise or the fall or indicating an end of the period of one frame corresponding to the rise or the fall.
2. The display device of claim 1, wherein the signal generating section is configured to feed the new ON/OFF signal into the plurality of driving circuits such that the plurality of driving circuits switch between the driving state and the non-driving state about coincidentally with an initial part of the synchronizing signal, the initial part being a change in the synchronization signal indicating a start of writing on the display section.

3. The display device of claim 1, wherein:
the display section is a liquid crystal panel including two substrates and a liquid crystal layer sandwiched between the two substrates;
at least one of the two substrates includes:
a plurality of scanning lines provided so as to extend in a direction of a row; and
a plurality of signal lines provided so as to extend in a direction of a column;
the plurality of pixels are placed at intersections where the plurality of scanning lines and the plurality of signal lines cross; and
the plurality of driving circuits apply voltage to one of the plurality of scanning lines and the plurality of signal lines.

4. The display device of claim 3, wherein the plurality of driving circuits are configured to apply voltage to the plurality of scanning lines.

5. The display device of claim 3, wherein the plurality of driving circuits are configured to apply voltage to the plurality of signal lines.

6. The display device of claim 1, wherein:
the plurality of driving circuits include at least one master driving circuit and at least one slave driving circuit; and
the signal generating section is included in the at least one master driving circuit.

7. A method of controlling a display device, the method comprising:
generating, on a basis of a synchronizing signal and an ON/OFF signal, the ON/OFF signal for switching between a driving state and a non-driving state of a plurality of driving circuits, a new ON/OFF signal synchronized with the synchronizing signal, the new ON/OFF signal for switching between the driving state and the non-driving state of the plurality of driving circuits;
feeding the new ON/OFF signal to the plurality of driving circuits; and
switching the driving state and the non-driving state of the plurality of driving circuits on a basis of the new ON/OFF signal, the switching in synchronization with timing of a rise or a fall of the synchronizing signal, the rise or the fall of the synchronizing signal indicating a start of writing on the display device in a period of one frame corresponding to the rise or the fall or indicating an end of the period of one frame corresponding to the rise or the fall, wherein the synchronizing signal is a vertical synchronizing signal that changes in a period of one frame, which is one periodic time.

8. The display device of claim 1, wherein the driving circuits are configured to switch between the driving and non-driving states each time a state of the new ON/OFF signal is changed.

9. The display device of claim 8, wherein the plurality of driving circuits are configured to stop driving the plurality of pixels of the display section based on the display data signal in the non-driving state.

10. A display device, comprising:
a display section including a plurality of pixels;
a plurality of driving circuits configured to drive each of the plurality of pixels of the display section based on a display data signal, an ON/OFF signal and a synchronizing signal; and
a signal generating section configured to generate, on a basis of the synchronizing signal and the ON/OFF signal, the ON/OFF signal for switching between a driving state and a non-driving state of the plurality of driving circuits, a new ON/OFF signal synchronized with the synchronizing signal, the new ON/OFF signal for switching between the driving state and the non-driving state of the plurality of driving circuits, and to feed the new ON/OFF signal into the plurality of driving circuits,
wherein the display device is configured to drive the plurality of pixels to display an image not based on the display data signal when the new ON/OFF signal is changed from an ON state to an OFF state,
the synchronizing signal is a vertical synchronizing signal that changes in a period of one frame, which is one periodic time, and
the signal generating section is configured to feed the new ON/OFF signal into the plurality of driving circuits such that the plurality of driving circuits switch between the driving state and the non-driving state in synchronization with timing of a rise or a fall of the synchronizing signal, the rise or the fall of the synchronizing signal indicating a start of writing on the display section in a period of one frame corresponding to the rise or the fall or indicating an end of the period of one frame corresponding to the rise or the fall.

11. The display device of claim 10, wherein the image is about a uniform black image.

12. The display device of claim 11, wherein the image is displayed for about 1 frame.

* * * * *